United States Patent [19]

Sugiyama et al.

[11] Patent Number: 5,633,723
[45] Date of Patent: May 27, 1997

[54] VIDEO PRINTER INCLUDING A DATA DELETION FEATURE INVOLVING MUTE DATA

[75] Inventors: Naoshi Sugiyama; Toshiaki Fujimaki, both of Saitama, Japan

[73] Assignee: Fuji Photo Film Co., Ltd., Kanagawa, Japan

[21] Appl. No.: 296,177

[22] Filed: Aug. 29, 1994

[30] Foreign Application Priority Data

Sep. 20, 1993 [JP] Japan .................................. 5-233523

[51] Int. Cl.⁶ .................. H04N 1/00; H04N 5/76; H04N 1/40; H04N 5/225
[52] U.S. Cl. .................. 358/296; 358/404; 358/444; 358/909.1; 386/46
[58] Field of Search ........................ 358/298, 296, 358/310, 332, 335, 345, 404, 444, 448, 452, 453, 501, 537, 538, 909.1; 355/204, 218, 38, 40, 54, 77

[56] References Cited

U.S. PATENT DOCUMENTS

5,115,320  5/1992  Ebihara et al. .................... 358/296
5,252,989  10/1993  Kawakami et al. ................ 347/171

*Primary Examiner*—Eric Frahm

[57] ABSTRACT

In a video printer, to delete a frame of video data stored in a frame memory, mute data is written in the frame memory over previously written video data by operating a memory delete key. Thereby, a mute image is displayed on a monitor. To delete one of a matrix of sub-frames of a multi-frame image, the sub-frame to be deleted is designated prior to operating the memory delete key, so that mute data is written in a corresponding location of the frame memory. Thereby, an image containing a blank in at least one sub-frame may be printed out.

21 Claims, 5 Drawing Sheets

VIDEO PRINTER INCLUDING A DATA DELETION FEATURE INVOLVING MUTE DATA

BACKGROUND OF THE INVENTION

1. Field of the Invention

The present invention relates to a video printer for making a hard copy from a video signal input from a video tape recorder (VTR) or the like. The present invention relates more particularly to a video printer which facilitates deleting an image displayed on a monitor in an entire area or in a section of a frame by muting the video data with predetermined mute data.

2. Related Art

As is known in the art, a video printer converts an analog video signal such as that from a VTR or an electric still camera, into digital data, and writes the digital data in an image memory such as a frame memory or a field memory, while processing the digital data so as to make an appropriate hard copy of an image based upon the digital data.

It is also known that the video printer can make a multi-frame print other than an ordinary single-frame print having a frame of image printed in the entire area of a sheet of recording medium. In the multi-frame print, four, nine or sixteen frames of images are printed in a matrix on a recording sheet at a reduction rate of ½, ⅓ or ¼, relative to the ordinary size frame. There are also two types of multi-frame print: one is a print having a matrix of different images, the other is a print having a matrix of identical images. In and the video printer, a memory key or freeze key is operated to memorize or freeze data of an image to be printed while monitoring the image on a video display device. For example, for the multi-frame print, the memory key is operated a number of times corresponding to the number of frames to be included in a multi-frame print. Each time the memory key is operated, a frame of an image is written in a designated location of the image memory after being reduced in size at a rate corresponding to the divisional number, that is, the number of sub-frames into which the ordinary size frame should be divided for the multi-frame print. After checking the arrangement and the content of the sub-frames on the monitor, a print key is operated to execute printing.

However, in the above-described printer, it is necessary to revise a memorized image to rewrite the image memory with another image. Therefore, in order to keep a sub-frame of a multi-frame print blank, it has been necessary to pick up a white plane image by a camera and write the white plane image in a memory location corresponding to that sub-frame.

If the memory key is operated while no video signal is input to the video printer, a noise image would be memorized and displayed on the monitor. The conventional solution for the problem is to disable the memory key or inhibit writing while there is no input video signal, and to display an error warning if the memory key is operated at that time. However, because the operator cannot quickly understand why the memory key is disabled and what kind of error happens, the conventional solution is insufficient.

In addition to these problems, since the number of keys for entering or selecting conditions for printing has increased with the increase of functions available in a single high-tech video printer, the lowered facility in operation and the increased production cost have become new problems.

SUMMARY OF THE INVENTION

In view of the foregoing, a primary object of the present invention is to provide a video printer which facilitates deleting all or a part of an image displayed on a monitor as the image to be printed in a frame.

A secondary object of the present invention is to provide a video printer which is prevented from writing a noisy image in an image memory when no video signal is input to the video printer.

A third object of the present invention is to provide a video printer which is provided with a larger number of functions without increasing the necessary number of operation keys.

To achieve the above and other objects, the present invention provides an operation device manually operated to enter a memory delete command for deleting video data stored in an image memory and a memory control device which writes mute data in response to the memory delete command in at least a part of the image memory to delete all or a corresponding part of the video data. Thus, all or a part of a half-tone image corresponding to the memorized video data may be easily replaced by a mute image such as a white or blue blank.

In case of a video printer which can make a multi-frame print, a designation device is provided to designate one of the sub-frames before the operation device is operated, so that the memory control device writes the mute data in a location of the image memory which corresponds to the designated sub-frame.

According to another embodiment, it is determined if there is a video signal input to a video printer, for example, by detecting synchronizing signals which should be contained in the video signal, each time a memory delete command is entered. If there is no video signal input, the mute data is written in the image memory. Therefore, the video printer is prevented from writing and displaying a noisy image, which would otherwise be written and displayed while no video signal is input to the video printer.

According to a third embodiment, it is determined if the video printer is set in a video input mode for writing video data in the image memory, or a conditioning mode for entering condition data in a condition memory, for example, for controlling image quality, selecting a print mode, designating the number of hard copies, and so forth. If a memory delete key is operated in the video input mode, the mute data is written in the image memory to delete memorized video data. If the memory delete key is operated in the conditioning mode, the condition data entered during the present conditioning mode is canceled. Thereby, the video printer is provided with the function to delete the memorized video image to blank out at least a part of an image frame, without the need for adding a specific key.

BRIEF DESCRIPTION OF THE DRAWINGS

The aforementioned and other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENT

Figure 1:
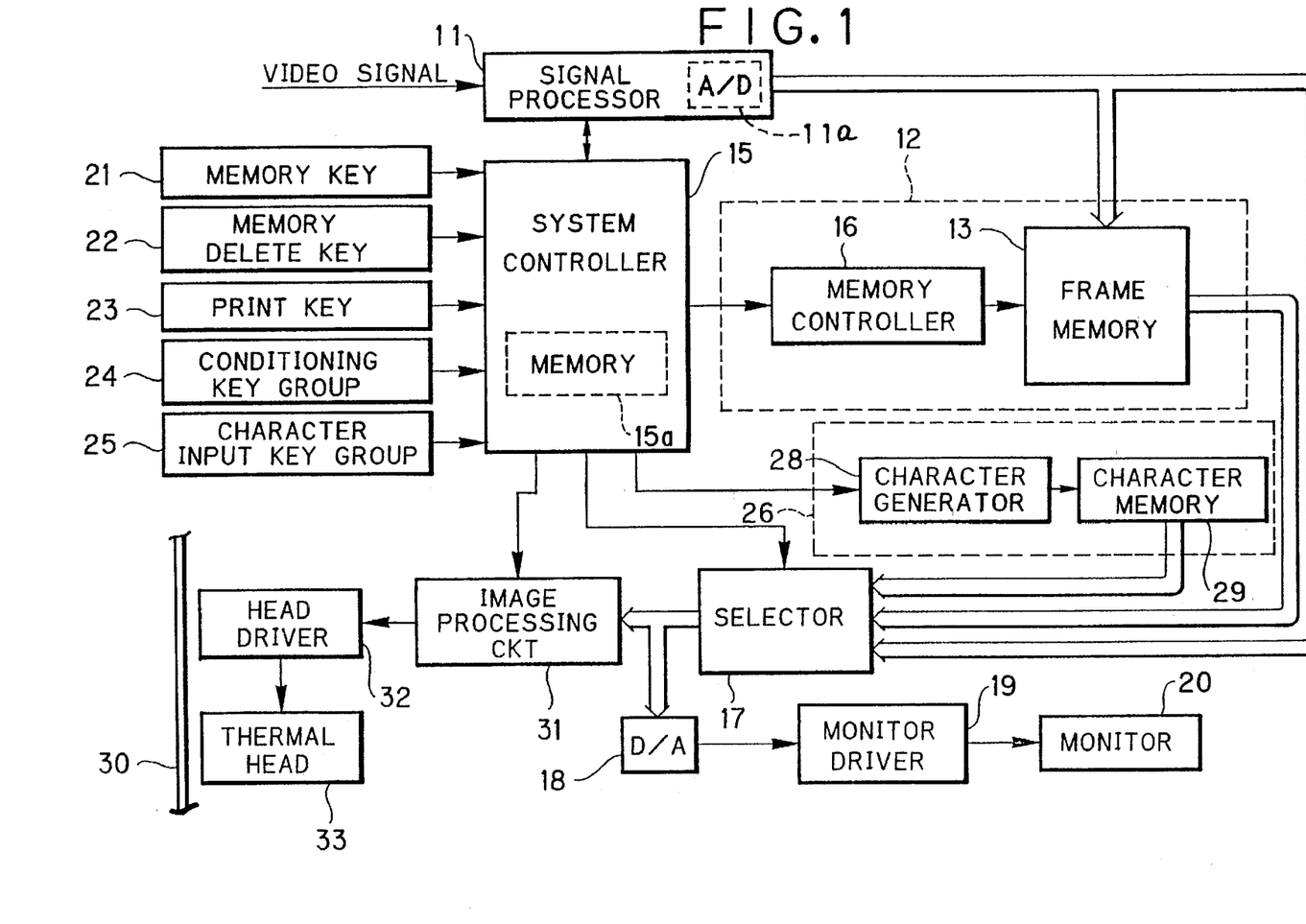
FIG. 1 is a block diagram of a video printer according to a preferred embodiment of the present invention.

In FIG. 1 showing a video printer according to a preferred embodiment of the invention, a video signal, such as a NTSC signal which is picked up by an electronic still camera or a video camera, converted into a digital video signal in an A/D converter 10, and is input into an signal processor 11 through an input terminal. The signal processor 11 extracts luminance and chrominance signals from the video signal, and processes these signals in accordance with print conditions stored in a memory 15a of a system controller 15. The processed luminance and chrominance signals are respectively converted into 8-bit digital signals (video data) by an A/D converter 11a, and are sent to a frame memory 13 of a memory section 12. It is possible to convert the luminance and chrominance signals into red, green and blue signals, and to send the three color signals to the frame memory 13.

The video data is written in the frame memory 13 for each frame under the control of a memory controller 16 which is controlled by the system controller 15. The video data written in the frame memory 13 is sent to a D/A converter 18 through a selector 17 when the selector 17 is set in a memorized image display mode. The selector 17 drives a monitor driver 19 to display an image on a monitor such as a CRT monitor 20 in correspondence with the video data stored in the frame memory 13. When the selector 17 is set in a video input display mode, the video data from the signal processor 11 is directly sent to the selector 17 without being stored in the frame memory 13, and is sent to the monitor 20 so as to display the input image on the monitor 20. Switching between the memorized image display mode and the video input display mode is controlled by the system controller 15.

The system controller 15 is connected to a memory key 21, a memory delete key 22, a print key 23, a group of conditioning keys 24 and a group of character input keys 25. When the memory key 21 is operated, video data of the image displayed on the monitor 20 is frozen and written in the frame memory 13 in accordance with various conditions set by the conditioning keys 24. The memory delete key 22 is operated to delete some video data written in the frame memory 13. The video data is deleted by being rewritten with such video data that represents a white blank, hereinafter referred to as white mute data. Thus, a section of one frame corresponding to the memory location having the white mute data is printed as a white blank. It is possible to use another kind of data such as blue or another color mute data or data of a background pattern for deleting video data.

The conditioning keys 24 are for setting several modes, e.g., for selecting one of a single-frame print mode and multi-frame print modes, for controlling the quality of image, i.e., color balance and density, and for designating the number of prints. Condition data entered through the conditioning keys 24 is written in the memory 15a of the system controller 15. When the single-frame print mode is selected, video data of an image such as a half-tone image is written as one frame in the frame memory 13. In the multi-frame print modes, one frame is sectioned into a plurality of sub-frames, e.g., four, nine or sixteen sub-frames, arranged in a matrix, and video data of a plurality of images is written in the frame memory 13 such that each sub-frame is assigned to one of the plurality of images. It is preferable to provide a mosaic print mode for printing a matrix of different images and a multiplex print mode for printing a matrix of identical images, to be selectable in each of the multi-frame print modes having the various number of sub-frames.

If the memory delete key 22 is operated in the single-print mode, the white mute data is written in all memory locations of the frame memory 13. In the multi-frame print modes, the memory delete key 22 is operated after the conditioning keys 24 are operated to designate the sub-frames to be deleted. The white mute data is overwritten in those memory locations which correspond to the designated sub-frames.

The character input keys 25 are operated to compose a character image in a white mute image or a half-tone image. In accordance with the operation of the character input keys, a character generator 28 of a character generating section 26 generates a character dot pattern corresponding to a phrase explaining the half-tone image, the date of photographing the image or other literal information. The character dot pattern is written in a character memory 29.

Character dot pattern data is sent from the character memory 29 to the selector 17. When the selector 17 is set in the memorized image display mode at that time, the character dot pattern inputted in the selector 17 is sent to the D/A converter 18 prior to the video data from the frame memory 13, and the video data is sent to the D/A converter 18 while the character dot pattern is not inputted. In this way, characters are composed in a half-tone image or a white mute image, and a composite image is displayed on the monitor 20 through the monitor driver 19, so as to permit checking to determine if the composite image is proper or not.

An image processing circuit 31 converts the chrominance and luminance data into yellow, cyan and magenta image data. When printing, the three color image data is sequentially sent to a head driver 32 to drive a thermal head 33 to print a full-color image on a thermosensitive color recording medium 30 according to a conventional three-color sequential printing method.

Figure 2:
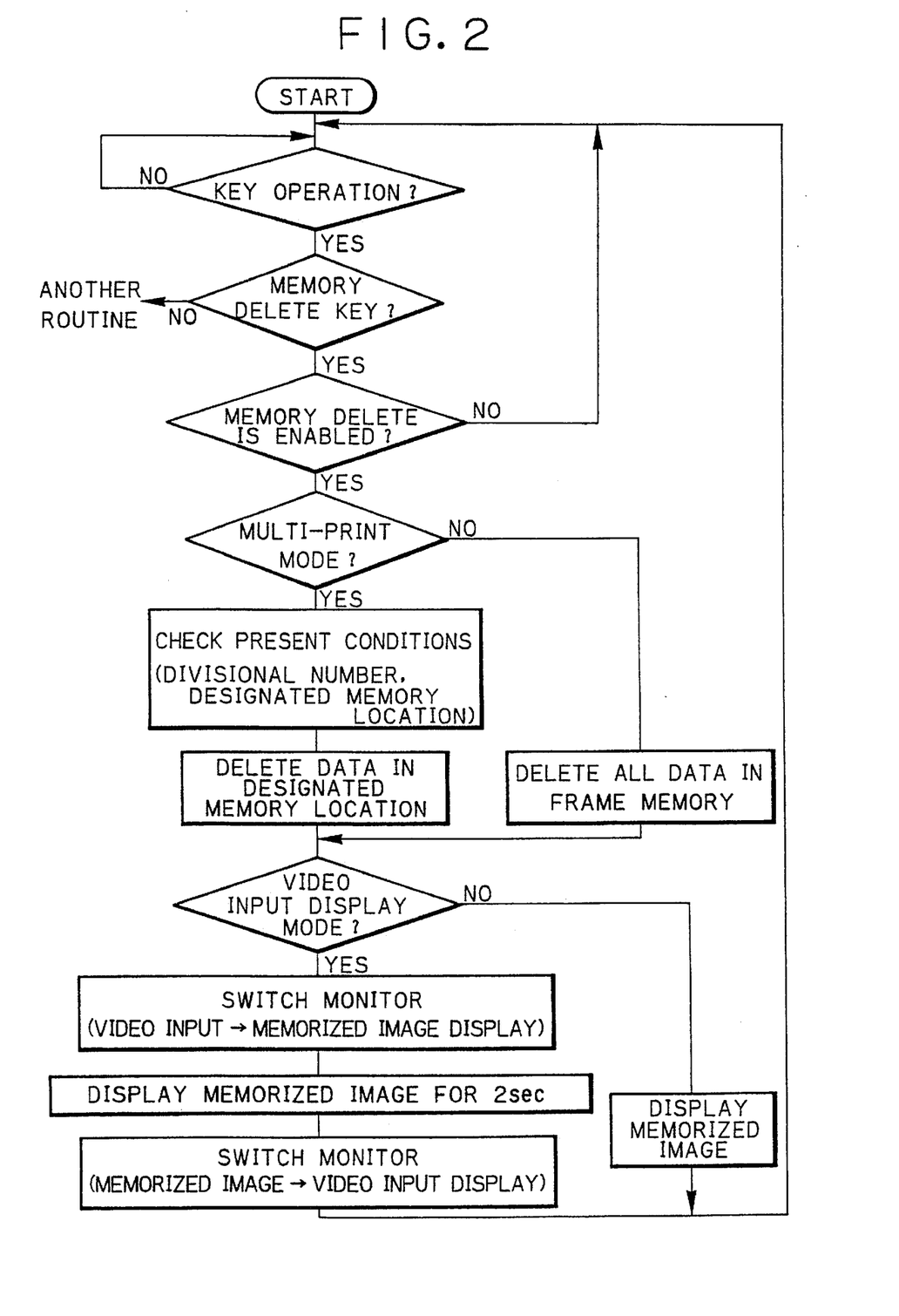
FIG. 2 is a flow chart illustrating a sequence of memory deleting.
Figure 3:
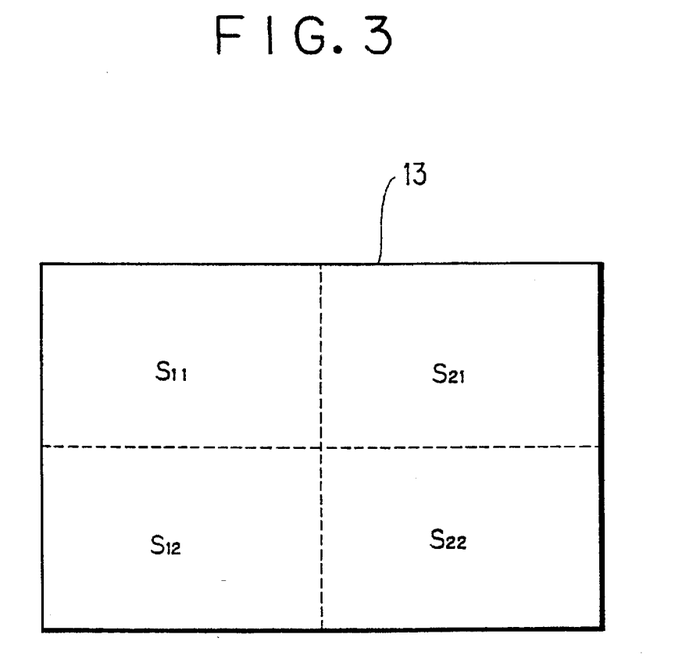
FIG. 3 is an explanatory view illustrating an arrangement of memory locations for a multi-frame print mode.
Figure 4:
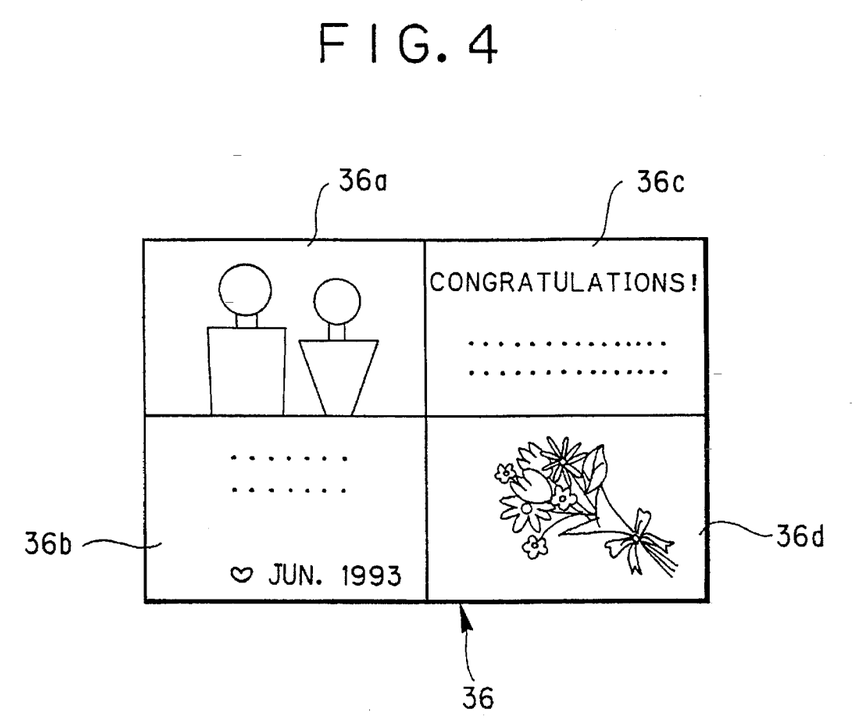
FIG. 4 is an explanatory view of a composite mosaic image displayed on a monitor in a multi-frame print mode.

The operation of the above-described video printer will now be described with reference to FIGS. 2 to 4.

First, the conditioning keys 24 are operated to set the video printer in the mosaic print mode having four sub-frames, for instance. The conditioning data is written in the memory 15a of the system controller 15. A video signal from a still video player or the like is converted into 8-bit video data and is sent to the D/A converter 18 through the selector 17.

If the image displayed on the monitor 20 is desired to be printed, the memory key 21 is operated to freeze the displayed image. Then, the memory controller 16 controls the frame memory 13 in accordance with the condition data stored in the memory 15a, so that video data corresponding to the displayed image but reduced in height and width to ½ is written in a memory location S11 of the frame memory 13. The memory location S11 is one of four memory locations S11, S12, S21 and S22 of the frame memory 13, corresponding to a quarter of one frame, as shown in FIG. 3. In the same way as above, video data of other three images is reduced and written in the memory locations S12, S21 and S22 by operating the memory key 21.

When the designated number of images are memorized in the frame memory 13, the system controller 15 switches the selector 17 from the video input display mode to the memorized image display mode, to send the video data written in the frame memory 13 to the selector 17. As a result, a memorized multi-frame image, that is, a mosaic image consisting of four different images is displayed on the monitor 20, such that the four images are displayed in four sub-frames 36a, 36b, 36c and 36d arranged in 2×2 matrix in one frame 36 of the monitor 20, as is shown in FIG. 4. If the print key 23 is operated in this stage, the four images arranged in 2×2 matrix are printed on a sheet of the thermosensitive recording medium 23, for example, of A6 size.

If the sub-frames 36b and 36c are to be deleted, a frame designation key included in the conditioning key group 24 is operated to designate the sub-frame 36b, and then the memory delete key 22 is operated. Then, the system controller 15 determines if it is permitted to delete any data of the frame memory 13. Memory delete is disabled during conditioning in the single-frame print mode and during the printing as well.

If memory delete is enabled, the system controller 15 determines if the video printer is in the multi-frame print mode and, if it is the multi-frame print mode, the system controller 15 checks the presently set conditions such as the number of sub-frames, the memory location designated to be delete. Thereafter, the system controller 15 sends a memory delete command to the memory controller 16, for deleting the video data stored in the memory location S12. The memory controller 16 then rewrites the memory location S12 with the white mute data, so that the formerly written video data is deleted. In the same way, the video data is rewritten with the white mute data in the memory location S21.

After the memory controller 16 deletes the video data in the desired memory locations, that is, 36b and 36c in this instance, the system controller 15 checks if the selector 17 is set in the video input display mode. If the selector 17 is in the video input display mode, the system controller 15 switches the selector 17 to the memorized image display mode to send the video data from the frame memory 13 to the D/A converter 18 so as to display the image memorized in the frame memory 13, that is, a revised mosaic image with two white blanks in the sub-frames 36b and 36c, is displayed on the monitor 20 for two seconds. Thereafter, the selector 17 is reset to the video input display mode. When all the sub-frames desired to be deleted have been deleted, the operator may switch the selector 17 to the memorized image display mode, so that the memorized image is continuously displayed on the monitor 20.

To compose characters in the image displayed on the monitor 20, a cursor is moved in a corresponding position in the frame 36 on the monitor 20, and then the character input keys 25 are operated. In response to the character input keys 25, the system controller 15 actuates the character generator 28 to output dot pattern data of the characters to be composed and writes the dot pattern data in the character memory 29. The dot pattern data is sent from the character memory 29 to the selector 17, so that the corresponding characters are composed in the displayed image. In this way, characters can be composed in appropriate portions of the image, for example, in the white blanks of the mosaic or multi-frame image, as shown in FIG. 4.

After checking the characters composed in the multi-frame image on the monitor 20, the print key 23 is operated to print out the multi-frame image with the characters. Then, the system controller 15 sends the video data of the composite multi-frame image to the image processing circuit 31, which then converts the video data into yellow, magenta and cyan image data. The yellow image data is sent to the head driver 32 to drive the thermal head 33 to thermally record a corresponding yellow image on a yellow recording layer of the thermosensitive color recording medium 30.

After the yellow recording, ultraviolet rays of about 420 nm are projected onto the recording medium 30 to optically fix the yellow recording layer. Thereafter, the magenta image data is sent to the head driver 32 to drive the thermal head 33 to thermally record a corresponding magenta image on a magenta recording layer of the thermosensitive color recording medium 30. After the magenta recording, ultraviolet rays of about 365 nm are projected onto the recording medium 30 to optically fix the magenta recording layer. Thereafter, the cyan image data is sent to the head driver 32 to drive the thermal head 33 to thermally record a corresponding cyan image on a cyan recording layer of the thermosensitive color recording medium 30.

When the conditioning keys 24 are operated to set the video printer in the single-frame print mode, a single-frame image is displayed on the entire screen 36 of the monitor 20. If the single-frame image displayed on the monitor 20 is desired to be printed, the memory key 21 is operated to write the corresponding video data in the frame memory 13 and, thereafter, the print key 23 is operated to execute printing of the single-frame image. If the memory delete key 22 is operated directly after the writing of the video data of the single-frame image, the white mute data is written in the entire locations of the frame memory 13 to delete the formerly written video data.

Figure 5:
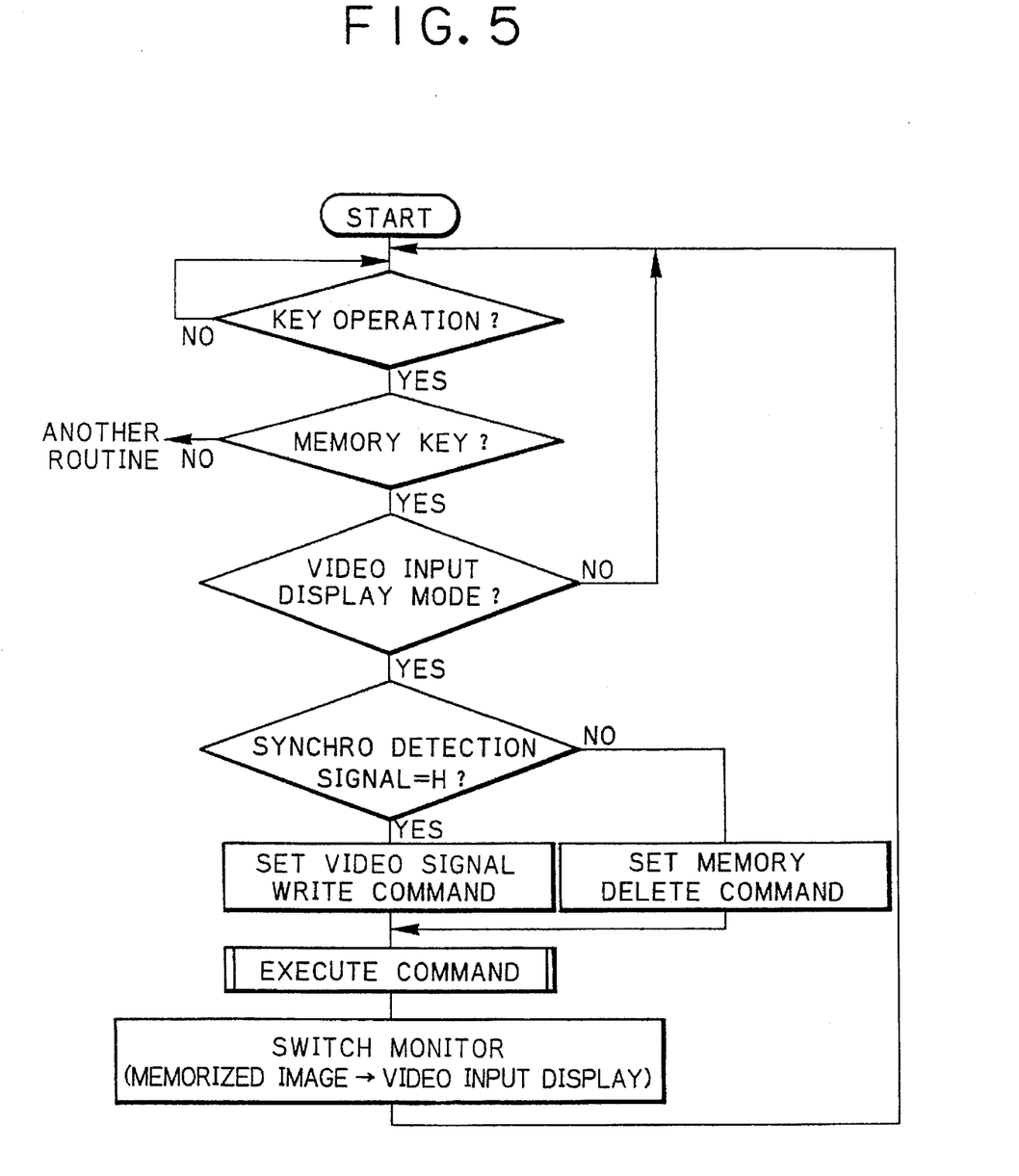
FIG. 5 is a flow chart illustrating a sequence for writing mute data while no video signal is inputted.

If the memory key 21 is operated while no video signal is inputted, a noise signal would be written in the frame memory 13. FIG. 5 shows a sequence for avoiding writing of the noise signal. According to this sequence, the system controller 15 determines if writing in the frame memory 13 is enabled, because the writing is disabled during printing and conditioning. When it is permitted to write new data in the frame memory 13, then the system controller 15 determines if the selector 17 is set in the video input display mode and, thereafter, determines if there is any input video signal. In the memorized image display mode, writing of video data in the frame memory 13 is disabled.

Whether the video signal is inputted or not is determined depending on whether synchronizing signals are inputted or not which must be contained in the video signal. If the synchronizing signals are detected, a synchro detection signal takes a high level. Then, the system controller 15 sends a video signal write command to the memory controller 16. If the no synchronizing signal is detected, the synchro detection signal takes a low level. Then, the system controller 15 sends a memory delete command to the memory controller 16. The memory controller 16 writes the video signal in the frame memory 13 in response to the video signal write command, or overwrites the white mute data in the frame memory 13 to delete the whole data in the memory 13 in response to the memory delete command. At that time, the video data is written in the frame memory 13 appropriately for the single-frame print mode or the multi-frame print mode.

The video printer may be set in a video input mode or a conditioning mode through a mode selection key included in the conditioning key group. In the video input mode, video data is permitted to be written in the frame memory 13. In the conditioning mode, conditioning data is permitted to be written in the memory 15a of the system controller 15.

Figure 6:
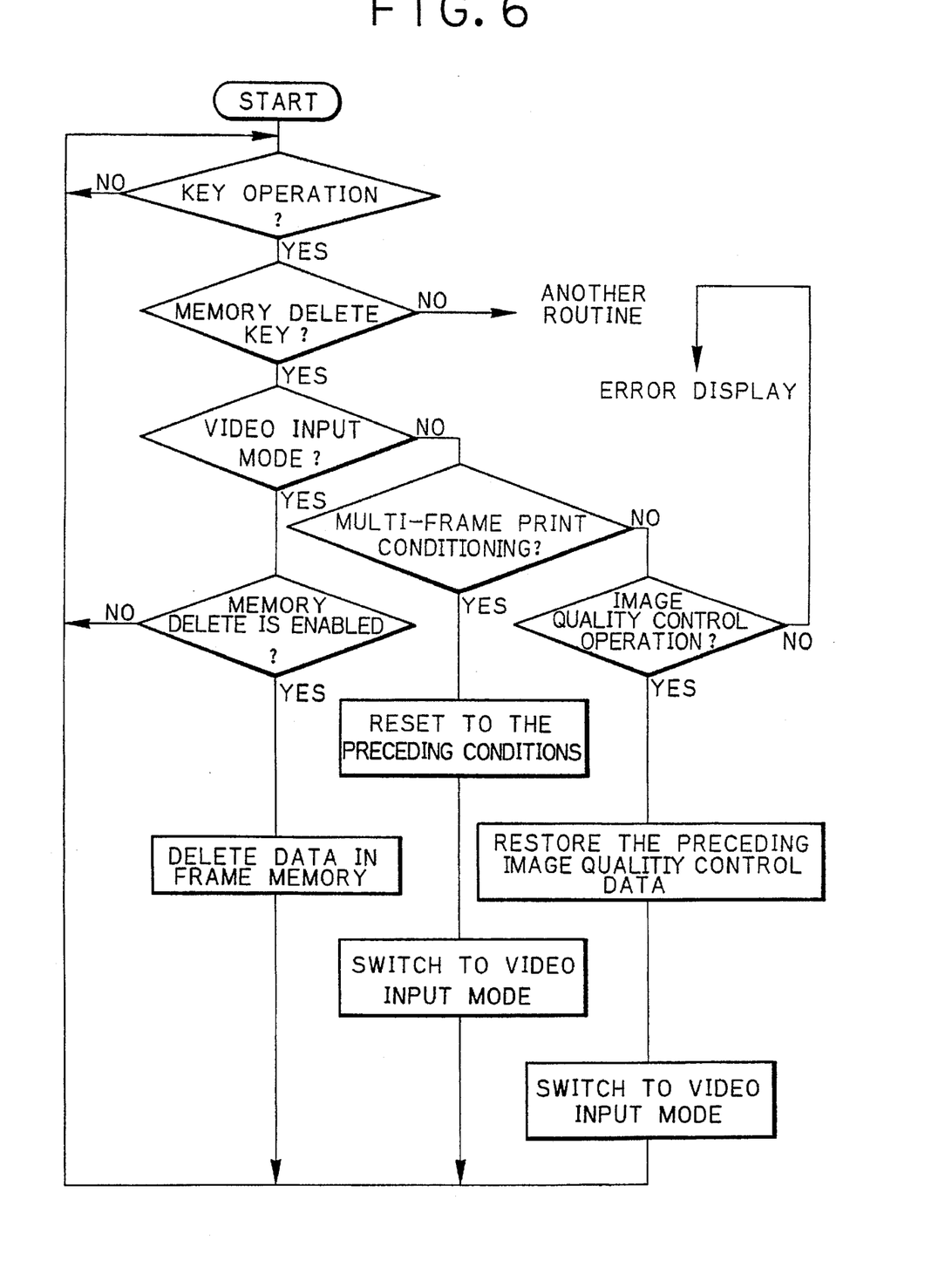
FIG. 6 is a flow chart illustrating a sequence for using a memory delete key for canceling condition data as well as for deleting video data.

According to another preferred embodiment, the memory delete key 22 is used for canceling condition data which have been set through the conditioning keys 24 and stored in the memory 15a of the system controller 15, in addition to the above-described use for deleting the frame memory 13. Referring to FIG. 6, when the memory delete key 22 is operated, the system controller 15 determines if the video printer is in the video input mode or the conditioning mode. When the video printer is set in the video input mode, the system controller 15 checks if the frame memory 13 is enabled to be deleted. If the answer is yes, the white mute data is written in designated memory locations in the multi-frame print mode, or in the whole locations of the frame memory in the single-frame print mode.

If, on the other hand, the video printer is set in the conditioning mode wherein conditions for multi-frame print are set, or image qualities are controlled, the memory delete key 22 functions as a condition cancel key. For example, when the memory delete key 22 is operated on the way of conditioning for multi-frame print mode, the condition data entered and stored in the memory 15a is canceled, and the memory 15a is reset to the preceding conditions. Thereafter, the video printer is switched from the conditioning mode to the video input mode. To permit resetting to the preceding conditions, the condition data previously stored is temporarily put aside within the memory 15a, and is not cleared off until the new conditioning is completed without the memory delete key 22 being operated. If the memory delete key 22 is operated while image qualities are controlled, the image quality control data having been stored in the memory 15a is canceled, and the preceding image quality control data is restored. Thereafter, the video printer is switched from the conditioning mode to the video input mode. If the memory delete key 22 is operated during printing, the monitor 20 displays an error warning.

While the present invention has been described in detail with respect to the preferred embodiments, the present invention should not be limited to the above-described embodiments. For example, characters may be composed by entering character image data picked up by an electric still camera or the like, instead of entering characters through the character input keys 25. It is of course possible to print out the white mute image without composing any characters therein, or to compose characters in the single-frame white mute image and a half-tone image as well.

As an example of the multi-frame print modes, there may be a strobe print mode for making a print having a succession of still frames or stop motions therein, besides the mosaic print mode and the multiplex print mode. It is preferable to sequentially display necessary procedures on the monitor 20 in the conditioning mode.

The present invention is applicable to other types of video printer such as a thermal transfer printer or a laser printer, although the above-described embodiment relates to a direct color thermal printer using the thermosensitive color recording medium.

It will be apparent to one skilled in the art that various other modifications can be made to the disclosed embodiment without departing from the scope of the invention as defined by the appended claims.

What is claimed is:

1. A video printer for making a hard copy of an image based on an analog video signal input to said video printer comprising:
    a conversion device for converting said analog video signal into digital video data;
    a memory for storing said digital video data;
    an operation device for generating a memory delete command, to delete said digital video stored in said memory; and
    a control device for writing mute data, in response to said generated memory delete command, in all or a part of said memory to delete all or a part of said digital video data stored therein, thereby replacing all or a part of said image by a mute image.

2. A video printer as claimed in claim 1, wherein said mute image represents a blank.

3. A video printer as claimed in claim 2, further comprising:
    a mode selection device for selecting one of a plurality of print modes, includes a single-frame print mode wherein a frame of said digital video data is written in said memory for printing a single-frame image, and a multi-frame print mode wherein a plurality of frames of said digital video data are written in said memory for printing a plurality of images, reduced in size, as a matrix of sub-frames; and
    a designation device for designating at least one of said sub-frames to be printed as said mute image upon selecting said multi-frame print mode, wherein said control device writes mute data in a location of said memory corresponding to said designated at least one of said sub-frames.

4. A video printer as claimed in claim 3, further comprising a composing device for composing characters in said image or said mute image.

5. The video printer of claims 1, wherein the video printer is capable of making a hard copy of a half-tone image.

6. The video printer of claim 1, wherein the operation device generates the memory delete command upon being manually operated.

7. A video printer for making a hard copy of an image based on an analog video signal input to said video printer, comprising:
    a conversion device for converting said analog video signal into digital video data;
    a memory for storing said digital video data;
    an operation device for generating a write command for writing said digital video data in said memory;
    a control device for checking for a presence of said analog video signal each time said operation device is operated, for executing said generated write command upon detecting input of said analog video signal to said video printer, and for writing mute data in said memory in response to said generated write command upon failing to detect input of said analog video signal to said video printer, said mute data representing a mute image.

8. A video printer as claimed in claim 7, wherein said control device checks for the presence of said analog video signal by detecting synchronizing signals contained in said analog video signal.

9. A video printer as claimed in claim 8, wherein said mute image represents a blank.

10. The video printer of claim 7, wherein the video printer is capable of making a hard copy of a half-tone image.

11. The video printer of claim 7, wherein the operation device generates the write command upon being manually operated.

12. A video printer for making a hard copy of an image based on an analog video signal input to said video printer, comprising:
    a conversion device for converting said analog video signal into digital video data;
    a first memory for storing said digital video data;
    a memory key for generating a command to write said digital video data in said first memory;

a memory delete key for generating a memory delete command;

a group of conditioning keys for generating condition data to set various print conditions in said video printer;

a second memory for storing said generated condition data;

a mode selection key for setting said video printer in one of a conditioning mode, permitting said condition data to be written in said second memory, and a video input mode, permitting said digital video data to be written in said first memory; and a control device for cancelling the writing of said condition data in said second memory in response to said memory delete command being generated subsequent to setting of said conditioning mode, and for writing mute data in said first memory to delete at least a part of said digital video data stored therein, in response to said memory delete command being generated subsequent to setting of said video input mode.

13. A video printer as claimed in claim 12, wherein said video printer is automatically reset to said video input mode after the control device cancels the writing of said condition data.

14. The video printer of claim 12, wherein the video printer is capable of making a hard copy of a half-tone image.

15. A method of making a hard copy of an image input to a video printer having a memory for storing digital video data corresponding to the image, said method comprising the steps of:

generating a memory delete command through a key operation;

storing mute data in at least a part of said memory in response to said generated memory delete command;

displaying an image containing a mute image in at least a part of the image in correspondence with the mute data and digital video data stored in said memory; and printing a hard copy of said displayed image based on said mute data and digital video data stored in said memory.

16. A method as claimed in claim 15, further comprising the steps of:

providing a first print mode wherein a frame of said digital video data is stored in said memory for printing of a single-frame image, and providing a second print mode wherein a plurality of frames of said digital video data are stored in said memory for printing of a plurality of images, reduced in size, as a matrix of sub-frames;

selecting one of said first and second print modes; and designating at least one of said sub-frames to be printed as said mute image upon selecting said second mode, wherein said mute data is stored in a location of said memory which corresponds to said designated at least one of said sub-frames.

17. The method of claim 15, further comprising the step of converting an analog video signal corresponding to the image, into the digital video data prior to storing the digital video data in the memory.

18. A method of making a hard copy of an image based on an analog video signal input to a video printer having an A/D converter for converting said analog video signal into digital video data and a memory for storing said video data, said method comprising the steps of:

generating a write command for writing said digital video data in said memory;

checking for a presence of said analog video signal, determined by detecting synchronizing signals contained in said analog video signal, each time said write command is generated;

executing said generated write command upon detecting input of said analog video signal to said video printer; and writing mute data in said memory in response to said generated write command, upon failing to detect input of said analog video signal to said video printer, said mute data representing a mute image.

19. A method of making a hard copy of an image based on an analog video signal input to a video printer having an A/D converter for converting said analog video signal into digital video data, a first memory for storing the digital video data, a group of conditioning keys for generating condition data to set various print conditions in the video printer, and a second memory for storing the generated condition data, said method comprising the steps of:

providing a memory delete key for generating a memory delete command;

providing a conditioning mode wherein said generated condition data is permitted to be written in said second memory, and providing a video input mode wherein said digital video data is permitted to be written in said first memory;

selecting one of said video input mode and said conditioning mode;

canceling the writing of said condition data in said second memory in response to said memory delete command being generated subsequent to selection of said conditioning mode; and writing mute data in said first memory to delete at least a part of said digital video data stored therein, in response to said memory delete command being generated subsequent to selection of said video input mode.

20. An apparatus for storing an image, comprising:

a memory for storing digital data corresponding to the image;

input means for inputting a memory delete command, used to delete at least portion of the stored digital data;

control means for writing mute data in response to the input memory delete command in at least a portion of said memory to delete at least a portion of the digital data stored in the memory, thereby replacing at least a portion of the image by a mute image; and output means for outputting the digital data and mute data stored in the memory, wherein the output means includes a printer for printing a hard copy of the image containing the mute image.

21. An apparatus for storing an image, comprising:

a memory for storing digital data corresponding to the image;

input means for inputting a memory delete command, used to delete at least portion of the stored digital data;

control means for writing mute data in response to the input memory delete command in at least a portion of said memory to delete at least a portion of the digital data stored in the memory, thereby replacing at least a portion of the image by a mute image, mode selecting means for selecting one of a single-frame mode wherein a frame of the digital data is stored in said memory and a multi-frame mode wherein a plurality of frames of the digital data are stored in said memory as a matrix of sub-frames;

sub-frame designating means for designating at least one of the sub-frames to be replaced by a mute image, wherein the control means writes mute data in a location of the memory corresponding to the designated at least one sub-frame; and output means for outputting a frame of the digital data and mute data stored in the memory upon selection of the single-frame mode, and for outputting a plurality of frames, as a matrix of sub-frames, of the digital data and mute data stored in the memory upon selection of the multi-frame mode, wherein the output means includes a printer for printing a hard copy of one of a frame and a matrix of sub-frames of a corresponding image containing the mute image.

* * * * *